United States Patent [19]

Langford, Jr.

[11] Patent Number: 4,875,532

[45] Date of Patent: Oct. 24, 1989

[54] ROLLER DRILL BIT HAVING RADIAL-THRUST PILOT BUSHING INCORPORATING ANTI-GALLING MATERIAL

[75] Inventor: James W. Langford, Jr., Red Oak, Tex.

[73] Assignee: Dresser Industries, Inc., Dallas, Tex.

[21] Appl. No.: 246,513

[22] Filed: Sep. 19, 1988

[51] Int. Cl.⁴ .................... B21D 53/10; E21B 10/22; F16C 33/12; F16C 33/24
[52] U.S. Cl. .................................... 175/371; 384/95; 175/372
[58] Field of Search .................. 175/371, 372; 384/95, 384/92; 29/149.5 PM

[56] References Cited

U.S. PATENT DOCUMENTS

| | | | |
|---|---|---|---|
| 2,104,819 | 1/1938 | Schlumpf | 384/92 |
| 2,595,904 | 5/1952 | Swart | 384/95 |
| 3,235,316 | 2/1966 | Whanger | 384/92 |
| 4,105,263 | 8/1978 | Sorensen et al. | 384/95 |
| 4,136,748 | 1/1979 | Dickerhoff | 175/337 |
| 4,172,395 | 10/1979 | Keller | 76/108 |
| 4,207,658 | 6/1980 | Sorenson | 29/149.5 |
| 4,402,617 | 9/1983 | McDowell | 384/95 |
| 4,439,050 | 3/1984 | Garner | 384/100 |
| 4,499,642 | 2/1985 | Vezirian et al. | 29/149.5 |
| 4,533,003 | 8/1985 | Bailey et al. | 384/95 X |
| 4,722,615 | 2/1988 | Bailey et al. | 384/95 X |

OTHER PUBLICATIONS

Kirk-Othmer, *Encyclopedia of Chemical Technology*, 3rd Edition, vol. 19, "Powder Metallurgy," pp. 28–60.

Primary Examiner—Stephen J. Novosad

[57] ABSTRACT

A rolling cutter earth drilling bit in which integral one-piece pilot bushings provide both radial and thrust load sliding surfaces which incorporate an anti-galling material. A roller cone bit has three downwardly extending arm members which terminate in cylindrical spindles for the rolling cutters. Each spindle has a stepped configuration providing an enlarged journal section which is stepped down to provide an annular thrust shoulder and a reduced pilot pin which projects from the thrust shoulder. The rolling cutter mounted on the spindle has an enlarged rearward bearing recess which receives the journal section of the spindle and a reduced forward bearing recess which receives the spindle pilot pin. An annular thrust face corresponding generally to the spindle shoulder is between the recesses. The pilot bushing has a sleeve portion extending into the reduced forward recess of the rolling cutter in an interference fit and an integral annular rim portion extending outwardly from the sleeve portion over the thrust face. The outer surface of the rim portion contacts the annular spindle shoulder in a thrust load relationship, and the inner surface of the sleeve portion receives the pilot pin in a radial load relationship. These surfaces incorporate an anti-galling material.

25 Claims, 1 Drawing Sheet

ROLLER DRILL BIT HAVING RADIAL-THRUST PILOT BUSHING INCORPORATING ANTI-GALLING MATERIAL

TECHNICAL FIELD

This invention relates to rotary earth drilling bits and more particularly to roller bits in which novel radial and thrust bearing configurations incorporating anti-galling materials are employed in sliding bearing surfaces of the bit.

BACKGROUND OF THE INVENTION

Typically wells are drilled into the earth's crust to desired subterranean location such as oil and/or gas bearing formations, or other formations of interest, through the application of rotary drilling techniques. In the rotary drilling of a well, a drilling fluid is circulated downwardly through the drill string and into the borehole through one or more ports located in the drill bit at the bottom of the drill string. The drilling fluid then moves upwardly through the annular space between the drill stream and the wall of the well to the surface. The drill cuttings formed at the bottom of the well by the action of the drill bit are entrained within the drilling fluid for circulation to the surface. The most widely used bits in rotary drilling operation are roller bits in which roller cones are mounted on the bottom of the bit so that as the bit is rotated, the cutting teeth of the cones roll along the bottom of the bore hole. The roller cones, usually three in number, although bits with more or less than three cones are also known, are rotatably mounted on spindles which project inwardly and downwardly from arm members depending from the shank portion of the drill bit.

In the rotary drilling operation, the rock or other earth material at the bottom of the bore hole is broken up by the cutting teeth of the roller cone, primarily through the compressive stresses resulting from the weight of the drill string on the drill bit. The bit itself is rotated at a relatively high speed resulting in rotation of the roller cones on their respective spindles under conditions imposing severe stresses and shock forces. In order to increase bit life, various techniques have been used to impart abrasion resistance in the sliding bearing surfaces which are normally encountered in the typical bit structure along with the rolling bearing surfaces such as are provided by roller bearings or ball bearing.

Roller bits commonly employ a spindle or shank structure upon which a rolling cutter is mounted and which is stepped down to terminate in a relatively small diameter projection commonly referred to as a "pilot pin." A hardened "thrust button" may be inserted in the roller cone in a thrust bearing relationship with the end of the pilot pin. Another procedure, as disclosed for example in U.S. Pat. No. 4,136,748 to Dickerhoff, is to employ a flat annular thrust washer which is in a conforming relationship with the spindle shoulder, or "thrust flange" surrounding the pilot pin. The thrust washer, along with a tapered roller bearing carries the thrust forces between the spindle and the roller cutter during the drilling operation. The bit disclosed in Dickerhoff also employs a small sleeve bearing in the cone into which the reduced pilot pin of the spindle is journaled to transfer radial loads. As also disclosed in Dickerhoff, the thrust washer and the sleeve bearing into which the pilot pin projects may be replaced by a single unitary bearing that is pressed in the small forward bore of the roller cutting and carries both radial and thrust loads. In the Dickerhoff structure, the tapered roller bearing configuration carries a substantial portion of the radial load along with the small sleeve bearing component, and also shares the thrust load with the flat annular thrust bearing component adjacent the pilot pin.

U.S. Pat. No. 2,104,819 to Schlumpf et al discloses a roller bit in which the rolling cutters are mounted on their respective spindles by means of ball bearings and sliding bearings. The outer spindles are stepped down in order to provide a forward projection of reduced diameter. In the Schlumpf bit, a stepped down sleeve which rotates relative to both the cutter cone and the spindle is used to provide both radial and thrust bearing surfaces. The bearing sleeve may be formed of carburized steel in order to increase the bit life.

It is also a conventional practice in the construction of roller bits to form part of the sliding bearing surfaces between the spindle and the roller cone of metal surfaces incorporating an anti-galling material. One technique for incorporating such anti-galling material is to provide alternate areas of steel and anti-galling material through the use of fenestrations, or slots, or circular or other shaped indentations such as disclosed in U.S. Pat. Nos. 3,235,316 to Whanger and 4,499,642 to Vezirian et al. Vezirian et al, for example, discloses the use of copper based alloys in a fenestrated ring bearing of a relatively hard metal formed of a ferrous based alloy or other metals such as nickel, chromium, cobalt, tungsten, titanium and metal carbides. In Whanger, anti-galling metals are incorporated into slotted or indented surfaces formed in the pilot pin, a roller cutter bushing receiving the pilot pin, the annular thrust flange surrounding the pilot pin, or in the enlarged rear portion of the spindle shaft as a substitute for roller bearings. In Whanger, the most effective antigalling materials appear to be an alloy of 85% silver and 15% manganese, although other anti-galling composites based upon lesser amounts of silver with metals such as copper, zinc and tin are also disclosed.

It is also known in the art to employ sliding bearing bushings in roller bits which are formed of a powder metallurgical composite providing a porous matrix in which an anti-galling material is infiltrated into the matrix. For example, U.S. Pat. No. 4,172,395 to Keller discloses a journal bearing bushing which is produced by sintering an alloy powder mixed with graphite at a temperature of 2050° F. for 40 minutes. The sintering operation is carried out in situ resulting in bonding of the porous matrix to the base metal of the cutter forging. At the conclusion of the sintering procedure, the porous matrix material is infiltrated with an anti-galling material such as silver, lead or plastic materials.

U.S. Pat. No. 4,207,658 to Sorenson discloses a roller cutting bit in which journal and pilot bearing bushings and thrust buttons are formed of powder metallurgical composites infiltrated with an anti-galling material. In Sorenson, the powder metallurgical components are formed of a low carbon, nickel-steel alloy powder which is pressed and sintered and then infiltrated with an anti-galling material such as silver alloys or babbitt metals. A specific anti-galling material is 85% silver—15% manganese alloy.

SUMMARY OF THE INVENTION

In accordance with the present invention, there is provided an earth drilling bit of the roller cutter type in which an integral one-piece pilot bushing is employed to provide both radial and thrust load sliding surfaces which incorporate an anti-galling material. The drill bit of the present invention provides a body portion which is adapted to be connected to a rotary drill member. The body portion has at least one downwardly extending arm member from which a cylindrical cuter spindle projects. The cutter spindle has a stepped configuration providing an enlarged journal section which is stepped down to provide an annular thrust shoulder and a reduced pilot pin which projects from the thrust shoulder. A rolling cutter is rotatably mounted on the spindle. The cutter has an enlarged rearward bearing recess which receives the journal section of the spindle and a reduced forward bearing recess which receives the spindle pilot pin. The internal reduction from one bearing recess to the other provides an annular thrust face which corresponds generally to the spindle shoulder. A pilot bushing is secured in the rolling cutter by means of an interference fit or other suitable means to prevent relative movement between the bushing and the cutter. The pilot bushing has a sleeve portion extending into the reduced forward recess of the rolling cutter and an integral annular rim portion extending outwardly from the sleeve portion over the thrust face. The outer surface of the rim portion contacts the annular spindle shoulder in a thrust load relationship, and the inner surface of the sleeve portion receives the pilot pin in a radial load relationship. The inner sleeve surface and the outer rim surface incorporate an anti-galling material. Preferably, the pilot bushing is formed of a powder metallurgical composite providing a porous matrix having an anti-galling metal infiltrated into the matrix.

In a further aspect of the invention, the rolling cutter is provided with a joural sleeve bushing to receive the enlarged journal section of the spindle in a radial load relationship. The inner surface of the journal sleeve bushing incorporates an anti-galling material. In another embodiment of the invention, the radial and thrust sliding surfaces of the pilot bushing have a hardened insert material disposed therein. In yet a further embodiment of the invention, annular rolling contact bearing means are interposed between the roller cutter and the spindle at a location intermediate the pilot bushing and the larger journal sleeve bushing.

DETAILED DESCRIPTION

In rotary drilling operations, the drill bit normally is rotated by turning the drill stem from the surface by means of a rotary table or power swivel. In some specialized applications, a downhole turbine motor may be used to rotate the drill bit. The bit rotation rate may vary from about 100 revolutions per minute in the case of conventional rotary table applications to several thousands rpm when a downhole turbine is used. As noted previously, the shock loads imposed upon the drill bit during such drilling operations are substantial, and it is advantageous to carry such loads on sliding bearing surfaces as contrasted with rolling contact bearing surfaces such as provided by ball bearings or roller bearings.

In order to increase the wear resistance of the sliding bearing surfaces, it has been proposed to employ bushings or thrust surfaces incorporating an anti-galling agent such as disclosed in the aforementioned patents to Whanger or Sorenson. It has also been proposed to form sliding forged surfaces of carburized steel or to provide hardened inserts such as the tungsten-chromium-cobalt alloys available from the Union Carbide Corporation under the trademark Stelite. Heretofore, the configuration of choice has involved the use of an enlarged journal bushing incorporating an anti-galling material with the bearing surfaces on the forward end of the roller cutter provided by carburized steel forging surfaces. While this provides for long wear, heat buildup in the thrust surface of the cone causes heat checking involving the formation of minute cracks on the bearing surface. Heat checking is an indication of insufficient lubrication. Once started, the bearing surface continues to degrade and can cause cracks to propagate through the cone and cause the bit to fail.

The present invention provides an improved rotary drill bit of the rolling cutter type in which an integral pilot bushing is used to carry both radial and thrust forces and in which the sliding surfaces of the bushing incorporate an anti-galling material. In fact, in the preferred embodiment of the invention, every sliding surface between the spindle and the rolling cutter is exposed to an anti-galling material, and the only rolling contact bearing surfaces in the bit are those used primarily to lock the roller cutter to the spindle.

Figure 1:
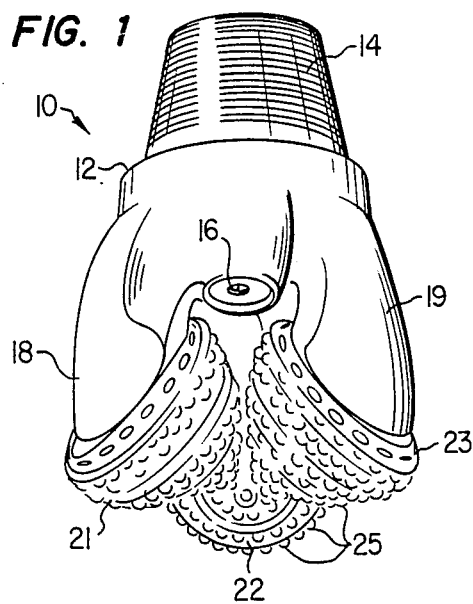
FIG. 1 is a perspective view of a rotary earth drilling bit of the type embodied in the present invention.

Turning now to FIG. 1 of the drawings, there is illustrated a perspective view of a roller bit 10 of the type embodied in the present invention. The drill bit comprises a body portion 12 which includes a threaded pin 14 which is adapted to be connected to a drill member such as a rotary drill collar or a turbine motor. The drill bit includes a central passageway extending from an opening (not shown) at the top of pin 14 which provides for the flow of drilling fluid through the bit and out of one or more nozzles such as nozzle 16. The drill bit comprises a plurality of downwardly extending arms 18 and 19, each of which carries a roller cutter which is of a generally conical configuration. In the embodiment illustrated, the bit is a three-cone bit comprising roller cutters 21, 22 and 23. This is the normal configuration for rotary drill bits, although such bits may have more or less than three roller cutters for special applications. Each roller cutter is mounted on a spindle which projects downwardly from its respective arm. The roller cutters comprise a plurality of teeth 25 which typically take the form of hard inserts of tungsten carbide or similar material which are mounted into the forged body of the cutter cones.

Figure 2:
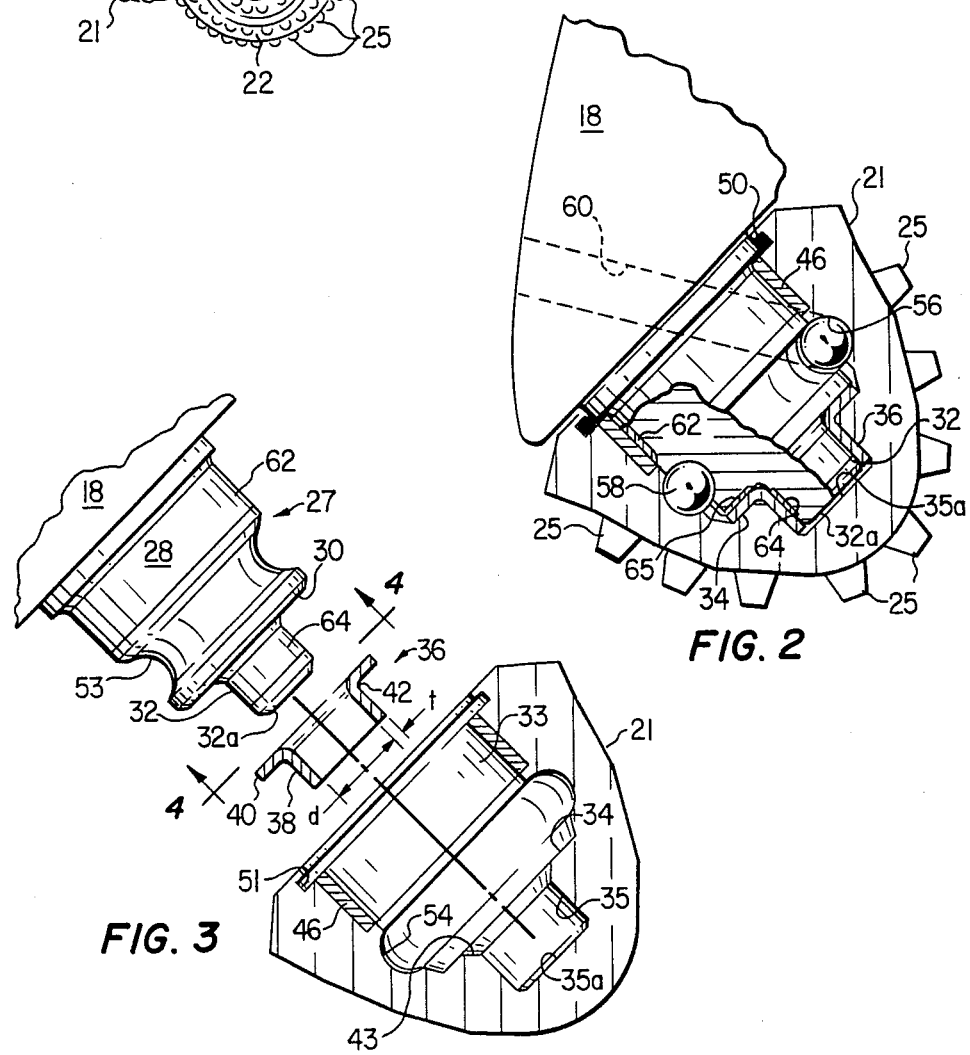
FIG. 2 is a side view, partly in section, of a portion of the earth drilling bit illustrated in FIG. 1.
Figure 3:
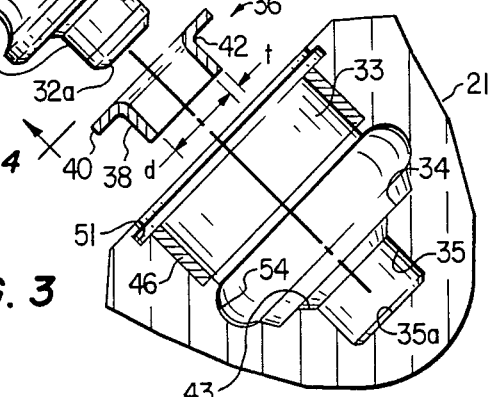
FIG. 3 is an exploded view partly in section showing the spindle, bushing and roller cutter components of FIG. 2.

FIG. 2 is a sectional view through one of the bit arms and its respective rolling cutter. FIG. 3 is an illustration of the spindle and cutter cone components shown in FIG. 2 with parts exploded to better show certain details. As shown in FIGS. 2 and 3, the arm 18 is provided with a projecting cylindrical spindle 27 upon which the cutter cone 21 is mounted for rotational movement. The arm and spindle typically are forged of one piece. The cylindrical spindle is of a stepped configuration providing an enlarged rear journal section 28 which is stepped down to provide an annular shoulder 30, commonly referred to as a thrust flange, and a reduced pilot pin 32 which projects outwardly from the shoulder 30.

The roller cutter 21 has an enlarged rearward bearing recess 33 receiving the enlarged journal section 28 of the spindle, an annular thrust face 34 and a reduced forward bearing recess 35 receiving the pilot pin 32. A pilot pin bushing 36, which incorporates an anti-galling material as described hereinafter, is secured into the forward bearing recess 35 in a manner to prevent rotational movement between the bushing and the cutter. While any suitable means may be employed to lock the bushing to the cutter cone, preferably the bushing is locked in the cone by means of an interference fit between the sleeve portion 38 of the bushing and the wall of recess 35.

The sleeve portion 38 of the pilot pin bushing 36 is received into the forward bearing recess 35 as described above. The bushing 36 has an annular rim portion 40 extending outwardly from the sleeve 38 and generally covering the internal thrust face 34 of the roller cone. The juncture between the rim portion and the sleeve portion of the pilot bushing is beveled or webbed as indicated at 42 to form a fillet which conforms to the pilot pin and reduces stress concentrations in the corner. The pilot pin recess 35 in the rolling cutter cone is similarly beveled as indicated at 43 in order to accommodate the fillet 42.

The unitary pilot bushing 36 offers a number of significant advantages. The use of the anti-galling material at the sliding bearing interfaces considerably reduces the heat developed between the contacting bearing surfaces. Further to the extent that heat checking in the bushing occurs, the resulting minute cracks are not propagated into the cone structure itself. Preferably, the pilot bushing is to be of a relatively thin wall construction. More specifically, in a preferred embodiment of the invention, the ratio of the wall thickness (dimension t in FIG. 3) to the bore diameter of the bushing (dimension d in FIG. 3) is within the range of 1:8–1:10. In a specific application of the invention, the internal sleeve diameter of bushing 36 is 1⅛", the outer diameter of rim portion 40 is 2¼", and the wall thickness for both the sleeve U portion and the rim portion is ⅛".

The larger bearing recess 33 in the cone is provided with a sleeve bushing 46 which also incorporates an anti-galling material in contact with journal bearing surface of the spindle. As described in greater detail hereinafter, sleeve bushing 46 may be formed of the same material as pilot bushing 36, but normally will be of a somewhat greater wall thickness. Bearing seal 50 is located in a groove 51 formed in the cutter cone 21.

The outer surface of the spindle 27 and the inner surface of the cone 21 are provided with conforming bearing raceways 53 and 54 which form a bearing chamber 56. Ball bearings 58 are inserted into the bearing chamber via an insert passage 60, shown in broken lines, to provide a ring of bearings to lock the cutter cone in place on the spindle. After a sufficient number of ball bearings are inserted via bore 60 to provide a ball bearing ring to lock the cone on the spindle, the bore 60 normally will be closed by welding a plug in place, as will be understood by those skilled in the art. Other cone retention means are also known to those skilled in the art. By locating the rolling contact bearing means between the journal and pilot pin bushings, the radial loads are carried on both sides of the bearing means. The ball races are dimensioned and designed so that the balls carry no radial load. Of course, the ball bearing is relieved of thrust loads by the rim portion 40 of the pilot bushing. It will be recognized that the ball bearing system, as well as the sliding bearing surfaces, can be provided with lubrication through suitable passages (not shown) within the arm and spindle.

Preferably, the spindle surfaces contacting the sliding surfaces provided by bushings 36 and 46 are provided with a hardened insert material in order to increase the life of the bearing surfaces. Thus, as shown in FIGS. 2 and 3, the journal section 28 is provided with a hardened insert 62 and the pilot pin is provided with a hardened ring insert 64. The thrust shoulder 30 is likewise provided with an annular insert 65. Inserts 62, 64 and 65 may be formed of any suitable material and desirably have a Rockwell C-Scale hardness (Rc) of at least 49. Preferably where the anti-galling material is silver or a silver alloy as described below, the hardened inserts are formed of cobalt-chromium-tungsten alloys available from Union Carbide under the Trademark Stelite.

The end face 32a of the pilot pin stops short of contact with the bottom face 35a of the recess 35. This leaves a space between faces 32a and 35a that the thrust load between the rolling cutter and the spindle is carried primarily by the rim 40 of the pilot bushing and the shoulders 30 and 34. Relatively small outward thrust loads will be carried by the bearing lock mechanism provided by ball bearings 58. Upward thrust is taken entirely by the ball bearings and races.

Figure 4:
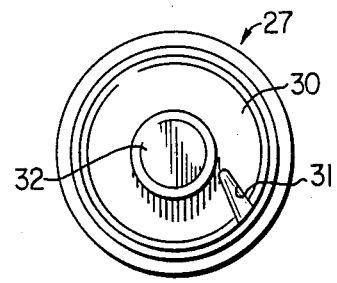
FIG. 4 is an end view of the spindle component of FIG. 3 as seen from line 4—4.

If desired, however, the roller cone can be provided with a forward recess having a thrust bottom bushing inserted in the bottom thereof in the manner, for example, as disclosed in the aforementioned U.S. Pat. No. 4,172,395 to Keller. In this case, it will be desirable to also incorporate a hard pad insert in the end face 32a of the pilot pin where it contacts with the upper surface of the thrust button bushing. These materials can be formed of materials similar to that used in forming the hardened inserts 62, 64 and 65. For example, if a hard pad at the bottom of the pilot pin is employed, it can be formed of a cobalt-chromiumtungsten alloy as described above. The corresponding thrust button bushing can be formed of M2 tool steel. The sliding surfaces provided by the anti-galling material may be, and preferably are, provided with lubrication through the application of a conventional lubricant such as grease. It is particularly desirable to provide for such lubrication at the sliding interface between the thrust face 30 and rim portion 40 of the pilot bushing which, as noted above, carries most of the thrust load between the rolling cutter and the spindle. As shown in FIG. 4, such lubrication may be facilitated by means of a lubricating groove 31 formed in the thrust face 30, including the hard pad 65. As shown, the groove can be tapered as it extends inwardly along an orientation angularly displaced from the radius of the pilot pin. As will be recognized by those skilled in the art, as the cutter cone rotates on the spindle in a counterclockwise direction as viewed in FIG. 4, relative movement between the bushing surface and the surface 30 will cause lubricant to be forced inwardly along groove 31 toward the center of the spindle.

The anti-galling material may be incorporated onto the bushing surfaces by any suitable procedure. It may be plated over the entire bearing surface of the bushing by plating techniques such as electroplating or chemical reduction deposition. For example, silver or silver alloys may be plated onto the internal surface of the sleeve portion 38 and the upper surface of the rim portion 40 of bushing 36 to provide a unitary coating of the type described in U.S. Pat. No. 4,439,050 to Garner. In most cases, however, heterogenous bearing surfaces providing for alternating areas of anti-galling material and hard wear-resistant metal will provide superior results over those obtained by employing a homogeneous layer of anti-galling material. Such heterogeneous bearing surfaces may be employed by using slotted or fenestrated structures such as disclosed in the aforementioned patents to Whanger or Vezirian or they may be formed by infiltrating a powder metallurgical composite with anti-galling material such as disclosed in U.S. Pat. Nos. 4,172,395 to Keller; 4,207,658 to Sorenson, and 4,402,617 to McDowell.

The use of a powder metallurgical composite infiltrated with anti-galling material is preferred. The formation of powder metallurgical products is well known in the art and is described, for example, in Kirk-Othmer, Encyclopedia of Chemical Technology, Third Edition, John Wiley & Sons 1982, Vol. 19, pp. 28–60 under the heading "Powder Metallurgy." Any suitable metal powder system such as disclosed in the aforementioned Kirk-Othmer article or in the aforementioned Keller, Sorenson and McDowell patents may be used. The powder material including suitable additives such as sintering aids and carbon is formed to the desired shape and compacted by conventional die or pressing methods and then sintered to produce the final product. The compaction of the green composite and the subsequent sintering procedure is carried out under conditions to arrive a porous structure which typically will have a density of about 80–90% of theoretical density. After sintering, the resulting porous matrix is infiltrated with an anti-galling metal which preferably is predominantly of silver. A suitable anti-galling material is an 85% silver, 15% manganese alloy as described in U.S. Pat. No. 4,207,658 to Sorenson. In addition, the bushings 36 and 46 may be formed of a powder metallurgical matrix which is bonded by brazing or other suitable procedure to a solid metal backing or shell. This configuration is particularly suitable for forming the large journal bushing 46, although it may be employed also in fabricating the pilot bushing 36. Where a hard metal shell is used in forming the pilot bushing, it should extend throughout both the sleeve portion and the rim portion in order to provide for good integrity of the one piece pilot bushing.

Having described specific embodiments of the present invention, it will be understood that modification thereof may be suggested to those skilled in the art, and it is intended to cover all such modifications as fall within the scope of the appended claims.

I claim:

1. In a rotary earth drilling bit, the combination comprising:
   a body portion adapted to be connected to a rotary drill member and having a downwardly depending arm member;
   a cylindrical cutter spindle extending from said arm member and having a stepped configuration providing an enlarged journal section which is stepped down to provide an annular shoulder and a reduced pilot pin projecting from said annular shoulder;
   a roller cutter rotatably mounted on said spindle and having an enlarged rearward bearing recess receiving said journal section and a reduced forward bearing recess receiving said pilot pin and defining with said enlarged recess an annular thrust face corresponding generally to said spindle annular shoulder;
   a pilot bushing secured in said roller cutter against rotational movement relative thereto and having a sleeve portion extending into said reduced forward recess and an integral annular rim portion extending outwardly from said sleeve portion over said thrust face, the outer surface of said rim portion contacting said spindle shoulder in a thrust load bearing relationship and the inner surface of said sleeve portion receiving said pilot pin in a radial load bearing relationship, said inner sleeve surface and said outer rim surface incorporating an anti-galling material; and
   a bearing chamber defined by raceways formed in said cutter spindle and said roller cutter at a location intermediate said pilot bushing and said enlarged journal section and a ring of ball bearings disposed in said bearing chamber, whereby radial loads are carried on both sides of said bearing chamber by the sleeve portion of said pilot bushing and said enlarged journal section and rearward bearing recess receiving said journal section, said ball bearings being dimensioned so that the outward thrust load between said roller cutter and spindle is carried primarily by the rim portion of said pilot bushing with no more than relatively small outward thrust loads carried by said ball bearings.

2. The combination of claim 1 wherein said outer rim and inner sleeve surfaces of said pilot bushing are provided by alternate areas of a relatively soft anti-galling metal and a relatively hard wear resistant metal.

3. The combination of claim 1 wherein the ratio of the wall thickness of said pilot bushing to the bore diameter of said pilot bushing is within the range of 1:8–1:10.

4. The combination of claim 1 wherein said pilot bushing is formed of a powder metallurgical composite providing a porous matrix and having an anti-galling metal infiltrated into said matrix.

5. The combination of claim 4 wherein said anti-galling metal is predominantly silver.

6. The combination of claim 1 wherein said pilot bushing is secured to said roller cutter by means of an interference fit between said sleeve portion of said bushing and the reduced recess of said roller cutter.

7. The combination of claim 1 wherein the juncture between the rim portion and the sleeve portion of said pilot bushing is provided with a fillet joint between the outer surface of said sleeve portion and the inner surface of said rim portion.

8. The combination of claim 1 wherein the length of said pilot pin is less than the depth of said reduced bearing recess as measured from the outer surface reduced said bushing rim portion whereby a space is left between the end face of the pilot pin and the bottom face of the bearing recess.

9. In a rotary earth drilling bit, the combination comprising:
   a body portion adapted to be connected to a rotary drill member and having a downwardly depending arm member;
   a cylindrical cutter spindle extending from said arm member and having a stepped configuration providing an enlarged journal section which is stepped down to provide an annular shoulder and a reduced pilot pin projecting from said annular shoulder;

a roller cutter rotatably mounted on said spindle and having an enlarged rearward bearing recess receiving said journal section and a reduced forward bearing recess receiving said pilot pin and defining with said enlarged recess an annular thrust face corresponding generally to said spindle annular shoulder;

a journal sleeve bushing in the enlarged bearing recess of said roller cutter and receiving said enlarged journal section of said spindle in a radial load bearing relationship, the inner surface of said journal bushing incorporating an anti-galling material; and a pilot bushing secured in said roller cutter against rotational movement relative thereto and having a sleeve portion extending into said reduced forward recess and an integral annular rim portion extending outwardly from said sleeve portion over said thrust face, the outer surface of said rim portion contacting said spindle shoulder in a thrust load bearing relationship and the inner surface of said sleeve portion receiving said pilot pin in a radial load bearing relationship, said inner sleeve surface and said outer rim surface incorporating an anti-galling material.

10. The combination of claim 9 further comprising annular rolling contact bearing means interposed between said roller cutter and said spindle at a location intermediate said journal sleeve bushing and said pilot bushing.

11. The combination of claim 9 wherein said pilot bushing is formed of a powder metallurgical composite providing a porous matrix and having an anti-galling metal infiltrated into said matrix.

12. The combination of claim 11 wherein said journal sleeve bushing is formed of a powder metallurgical composite providing a porous matrix and having an anti-galling metal infiltrated into said matrix.

13. The combination of claim 11 wherein said anti-galling metal is predominantly silver.

14. The combination of claim 11 further comprising a hardened insert material disposed in the outer surface of said enlarged spindle journal section in contact with the inner surface of said journal bushing.

15. The combination of claim 9 further comprising hardened insert material disposed in the spindle surfaces contacting the inner surface of the sleeve portion of said pilot bushing and the outer surface of the rim portion of said pilot bushing.

16. The combination of claim 15 wherein said hardened insert material comprises a cobalt-chromium-tungsten alloy having a Rockwell hardness of at least 49 Rc.

17. In a rotary earth drilling bit, the combination comprising:

a body portion adapted to be connected to a rotary drill member and having a downwardly depending arm member terminating in a cylindrical spindle member;

said spindle member having a stepped configuration providing an enlarged journal section which is stepped down to provide an annular shoulder and a reduced pilot pin projecting from said annular shoulder;

a roller cutter rotatably mounted on said spindle and having an enlarged rearward bearing recess receiving said journal section and a reduced forward bearing recess receiving said pilot pin and defining with said enlarged recess an annular thrust face corresponding generally to said spindle annular shoulder;

a journal sleeve bushing secured in said enlarged rearward bearing recess of said roller cutter, the inner surface of said bushing and the outer surface of said enlarged journal section of said spindle providing sliding bearing surfaces in a radial load bearing relationship;

a pilot bushing secured in said roller cutter against rotational movement relative thereto and having a sleeve portion extending into said reduced forward recess and an integral annular rim portion extending outwardly from said sleeve portion over said thrust face, the outer surface of said rim portion and the surface of said spindle shoulder providing sliding bearing surfaces in a thrust load bearing relationship and the inner surface of said sleeve portion and outer surface of said pilot pin providing sliding bearing surfaces in a radial load bearing relationship; and all of the sliding bearing surfaces between said roller cutter and said bushing, including said radial load bearing surfaces and said thrust load bearing surfaces having an anti-galling material at the interfaces between said sliding surfaces.

18. The combination of claim 17 further comprising a ring of ball bearings disposed in a bearing chamber defined by raceways formed in said roller cutter and said spindle at a location intermediate said journal sleeve bushing and said pilot bushing.

19. The combination of claim 18 wherein said pilot bushing is secured to said roller cutter by means of an interference fit between said sleeve portion and said reduced recess of said roller cutter.

20. The combination of claim 18 wherein said pilot bushing is formed of a powder metallurgical composite providing a porous matrix and having an anti-galling metal infiltrated into said matrix.

21. The combination of claim 20 wherein said journal bushing is formed of a powder metallurgical composite providing a porous matrix and having an antigalling metal infiltrated into said matrix.

22. The combination of claim 21 further comprising hardened insert material disposed in the spindle surfaces contacting the inner surface of said journal bushing, the inner surface of the sleeve portion of said pilot bushing and the outer surface of the rim portion of said pilot bushing.

23. The combination of claim 19 wherein the juncture between the rim portion and the sleeve portion of said pilot bushing is provided with a fillet joint between the outer surface of said sleeve portion and the inner surface of said rim portion.

24. The combination of claim 23 wherein the outer rim and inner sleeve surfaces of said pilot bushing and the inner surface of said journal bushing are provided by alternate areas of a relatively soft anti-galling metal and a relatively hard wear resistant metal.

25. The combination of claim 17 wherein the length of said pilot pin is less than the depth of said reduced bearing recess as measured from the outer surface of said bushing rim portion whereby a space is left between the end face of the pilot pin and the bottom face of the bearing recess.

* * * * *

UNITED STATES PATENT AND TRADEMARK OFFICE
CERTIFICATE OF CORRECTION

PATENT NO. : 4,875,532

DATED : October 24, 1989

INVENTOR(S) : James W. Langford, Jr.

It is certified that error appears in the above-identified patent and that said Letters Patent is hereby corrected as shown below:

Column 2, line 10, change "outer" to --cutter--.
Column 3, line 7, change "cuter" to --cutter--;
         line 35, change "joural" to --journal--.
Column 5, line 43, delete "U".
Column 6, line 40, change "cobalt-chromiumtungsten" to
                   --cobalt-chromium-tungsten--.
Column 8, line 56, change "reduced" to --of--.

Signed and Sealed this

Seventh Day of May, 1991

Attest:

HARRY F. MANBECK, JR.

Attesting Officer    Commissioner of Patents and Trademarks